UNITED STATES PATENT OFFICE.

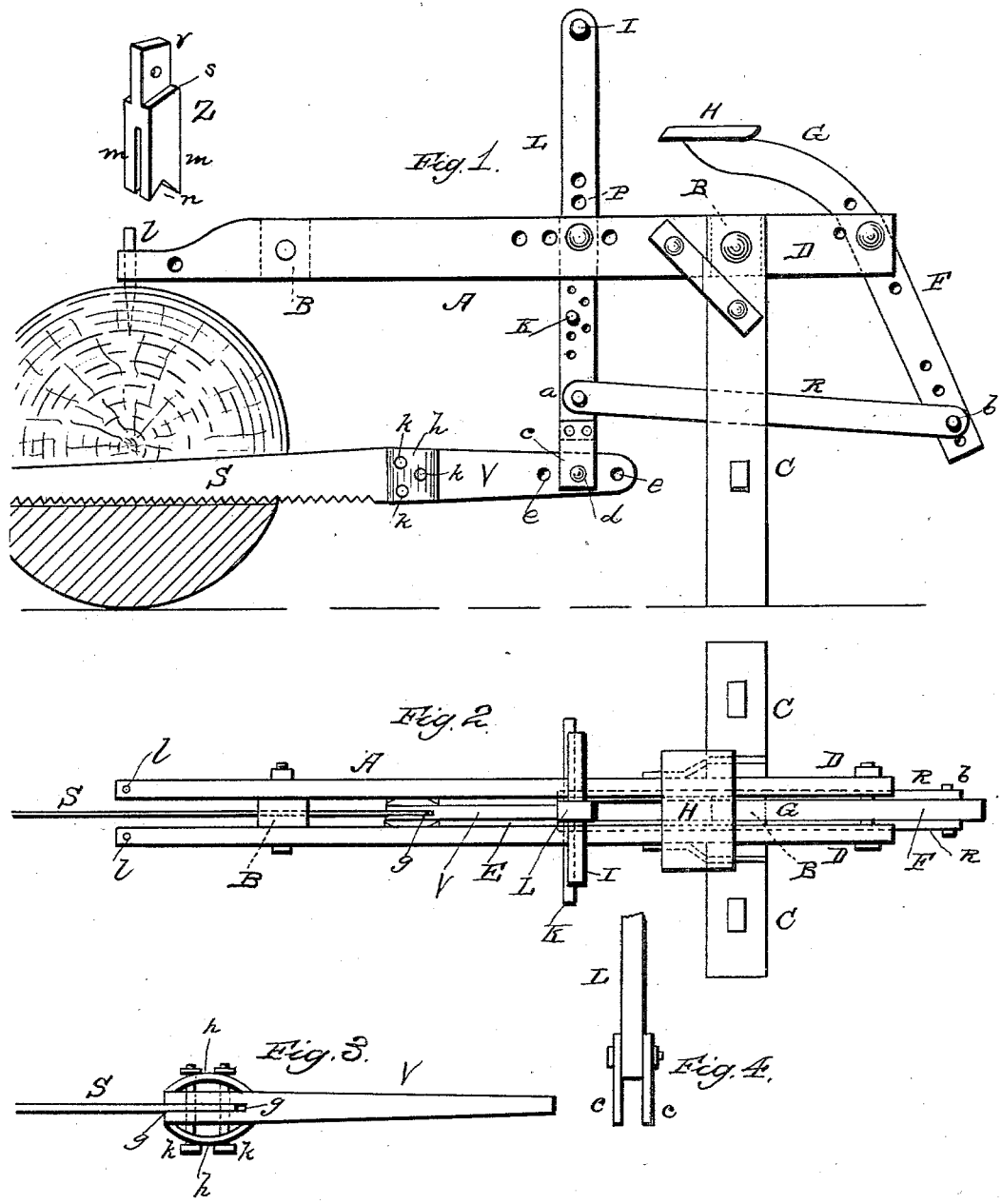

JOHN T. H. DRAKE, OF EMPORIA, MISSOURI.

DRAG-SAW.

SPECIFICATION forming part of Letters Patent No. 300,233, dated June 10, 1884.

Application filed February 19, 1884. (No model.)

*To all whom it may concern:*

Be it known that I, JOHN T. H. DRAKE, a citizen of the United States, residing at Emporia, in the county of Daviess and State of Missouri, have invented certain new and useful Improvements in Sawing-Machines; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side view of this invention. Fig. 2 is a top view of the same. Figs. 3 and 4 are details.

This invention has relation to sawing-machines; and it consists in the construction and novel arrangement of devices, as hereinafter set forth, and particularly pointed out in the appended claim.

In the accompanying drawings, the letter A designates the body of the frame, which consists of two parallel bars extending horizontally, and having an interval, E, between them. Near the front and rear ends of these bars blocks B are interposed to keep them the proper distance apart. The standards C are bolted to the bars A near their rear ends, as shown, said bars extending in rear of the standards, as at D, to afford bearings for the seat-lever F, which is curved forward in its upper portion, which extends above the bars, as indicated at G. To the upper end of this lever is secured the seat H.

Pivoted between the parallel bars A, in front of the standards, is the main operating-lever, L, the upper portion of which is provided with a transverse bar or handle, I, and the lower arm of which is provided with treadle projections or lateral arms K at the proper distance from the seat to be conveniently reached by the operator seated thereon. The handle and treadle-bars are adjustable, so that they can be arranged to suit different persons. The lever is also adjustable at the pivot P. Below the treadle the lever L is connected to the lower end of the seat-lever by pitman-bars or connecting-rods R, the ends of which are respectively pivoted to the levers, as shown at *a* and *b*, these pivotal points being made adjustable by providing series of bearings for the pivot-bolts in the lever-arms.

To the lower end of the operating-lever L are secured the plate-bearings *c*, which extend downward parallel to each other, and have an interval between them sufficient to receive the end of the saw-bar V, which is pivoted to the bearings by means of a bolt, *d*. A series of perforations, *e*, in said saw-bar provide for its adjustment. The front end of the saw-bar is formed with a cleft-bearing, *g*, for the heel of the saw, and concave binding-plates *h* are placed on each side of the bearing, and are held up by means of the bolts *k*, which pass through perforations in said plates, and in the cleft-bearing, and through the heel of the saw, securing the latter rigidly. The saw S extends forward in line with the saw-bar and works between the front ends of the frame-bars A, which are usually set to the log by means of vertical spikes *l*, which pass through the ends of the parallel bars, as shown. In some cases a fork-guide, Z, is employed, the branches *m* of which extend downward, and are notched in their lower edges, as at *n*, to form bearings by which the fork engages the log, the saw working between the branches. The upper portion of the fork-block is narrowed at *v* above lateral shoulders *s*, this narrow portion or tongue extending upward between the ends of the parallel bars, and being bolted thereto by means of a bolt, which is removable. The operator, mounted upon the seat H, places his feet upon the treadle-bears or rests of the lever, as at K, and, taking hold of the handle, is enabled to work the saw with great force by an easy movement of the body and limbs, in which the weight of the body assists.

Having described this invention, what I claim, and desire to secure by Letters Patent, is—

The sawing-machine described, consisting of the main frame A, the curved adjustable seat-beam G, pivoted in the rear thereof, as shown, the adjustable operating-lever L, standards C C, the adjustable kerfed head saw-bar V, concavo-convex clamping-plates h, the saw, and its securing-bolts, the forked guide Z, and bar R, connecting the saw and main operating-lever, with the seat-beam, substantially as specified.

In testimony whereof I affix my signature in presence of two witnesses.

JOHN T. H. DRAKE.

Witnesses:
    JOHN W. BLACK,
    E. E. WHITT.